United States Patent [19]

Uetake et al.

[11] Patent Number: 4,648,990

[45] Date of Patent: Mar. 10, 1987

[54] SOLIDIFIED RADIOACTIVE WASTES AND PROCESS FOR PRODUCING THE SAME

[75] Inventors: Naohito Uetake; Fumio Kawamura, both of Hitachi; Hideo Yusa, Katsuta; Makoto Kikuchi; Shin Tamata, both of Hitachi, all of Japan

[73] Assignee: Hitachi, Ltd., Tokyo, Japan

[21] Appl. No.: 681,907

[22] Filed: Dec. 14, 1984

[30] Foreign Application Priority Data

Dec. 16, 1983 [JP] Japan ................................ 58-236284

[51] Int. Cl.⁴ ............................ G21F 9/16; C09D 1/02

[52] U.S. Cl. ........................................ 252/628; 106/74; 106/76; 252/629; 252/633; 264/0.5

[58] Field of Search ............... 252/629, 626, 628, 631, 252/635, 633; 106/74, 76, 78, 38.3, 85, 89; 427/5.6; 264/0.5; 159/47.3, DIG. 12

[56] References Cited

U.S. PATENT DOCUMENTS

| | | | |
|---|---|---|---|
| 3,988,258 | 10/1976 | Curtiss et al. | 252/628 |
| 4,122,028 | 10/1978 | Iffland et al. | 252/628 |
| 4,173,546 | 11/1979 | Hayes | 252/628 |
| 4,482,481 | 11/1984 | Bandyopadhyay et al. | 252/628 |
| 4,505,851 | 3/1985 | Funabashi et al. | 252/629 |
| 4,518,508 | 5/1985 | Conner | 252/628 |

*Primary Examiner*—John F. Terapane
*Assistant Examiner*—Howard J. Locker
*Attorney, Agent, or Firm*—Beall Law Offices

[57] ABSTRACT

This invention concerns solidification products capable of immobilizing radioactive wastes containing water soluble solid components stably for a long period of time, as well as a process for producing the same, in which radioactive wastes are immobilized with an alkaline earth metal silicate compound and the alkaline earth metal silicate compound intakes the water content in the solidifying agent as the bound water to or a hydrate. High temperature and high humidity condition has been found to be necessary upon curing in order to take the water content as the bound water. This invention can provide solidified wastes with less development of detects such as open pores or cracks.

27 Claims, 12 Drawing Figures

SOLIDIFIED RADIOACTIVE WASTES AND PROCESS FOR PRODUCING THE SAME

BACKGROUND OF THE INVENTION

This invention concerns solidified radiocative wastes and a process for producing the same and, more specifically, it relates to solidified radioactive wastes suitable to stable immobilizing of radioactive wastes containing water soluble solid components for a long time, as well as a process for producing the same.

For the stable storage or disposal of radioactive wastes resulted from those facilities for handling radioactive materials such as nuclear power plants, it is necessary to pack and immobilize the radioactive wastes together with a solidifying material within a container so that radioactive materials may not diffuse to the surrounding environment.

Among the radioactive wastes, those resulted from BWR type reactors mainly comprise sodium sulfate and ion exchange resins and those resulted from PWR type reactors mainly comprise sodium borate. Among them, sodium sulfate and sodium borate are highly water soluble and the ion exchange resins are swollen upon absorption of water. Accordingly, the mixing ratio of radioactive wastes can not be increased and no stable solidification products can be formed in the case of using water setting inorganic solidifying materials such as cements since water has to be used in the admixture therewith. Further, since residual water in the thus formed solidification products leaves passages (open pores) upon evaporization to increase the porosity therein, the leaching rate of the radioactive materials is increased.

It has been developed a pellet solidifying process in which pelletized radioactive wastes such as of sodium sulfate are mixed with solidifying material to improve the mixing ratio of the radioactive wastes. However, also in this process, bulky pellets may absorb water to swell in the case of using a water setting solidifying agent that requires water. In addition, the water setting solidifying agent may possibly result in cracks due to the uneven shrinkage caused by the curing reaction that lasts for a long period of time and if the cracks are developed as far as the water soluble pellets, intended immobilizing effect for the radioactive material by the solidifying material can no more be attained.

While on the other hand, a technique of utilizing organic asphalts or plastics as the solidifying material has been developed and partially put to practical use. However, since these organic solidifying materials require heating upon their solidification, they may cause decomposition or degradation and they are not always excellent in the heat resistance and radiation stability.

In view of the above, the present inventors have made a study on inorganic solidifying material having excellent compatibility with water soluble material and, as the result, have found that a solidifying material comprising the solution of an alkali silicate can prevent the leaching of water soluble radioactive wastes and immobilize them effectively. Although the solidifying agent composed of the alkali silicate solution comprises an inorganic material and is excellent both in the heat resistance and radiation stability, it is insufficient in the water proofness and causes uneven shrinkage tending to induce cracking in the same manner as cement material.

SUMMARY OF THE INVENTION

Accordingly, it is an object of this invention to provide solidified radioactive wastes with less development of defects such as open pores and cracks.

Another object of this invention is to provide a process for producing solidified radioactive wastes with less development of defects such as open pores and cracks.

A further object of this invention is to immobilize radioactive wastes into solidified products excellent in the strength and the radioactivity confining performance.

In accordance with this invention, for attaining the foregoing objects, material comprising a solution of alkali silicate is used as the solidifying material for settling radioactive wastes with safety for the storage or disposal thereof, an alkaline earth metal compound is used as the curing material for curing the solution of alkali silicate to form an alkaline earth metal silicate compound, and the water content in the solution of alkali silicate is intaken as the bound water in the alkaline earth metal silicate compound to form a hydrate, to thereby obtain solidified radioactive wastes excellent in the durability.

Specifically, the first feature of this invention resides in solidified radioactive wastes formed by covering and immobilizing radioactive wastes with solidifying material, in which the radioactive wastes are immobilized by an alkaline earth metal silicate compound, and the alkaline earth metal silicate compound intakes the water content in the radioactive wastes as the bound water to form a hydrate.

The second feature of this invention resides in a process for producing solidified radioactive wastes by covering and immobilizing radioactive wastes with solidifying material, which comprises the steps of mixing a solution of alkali silicate, an alkaline earth metal compound and radioactive wastes or mixing an alkaline earth metal silicate compound and radioactive wastes and, thereafter, heating the mixture under a highly humid condition to cure the solution of alkali silicate, to thereby obtain solidified radioactive wastes.

These and other features, objects as well as advantages of this invention will become apparent by reading the following descriptions referring to the accompanying drawings.

DESCRIPTION OF PREFERRED EMBODIMENTS

Figure 1:
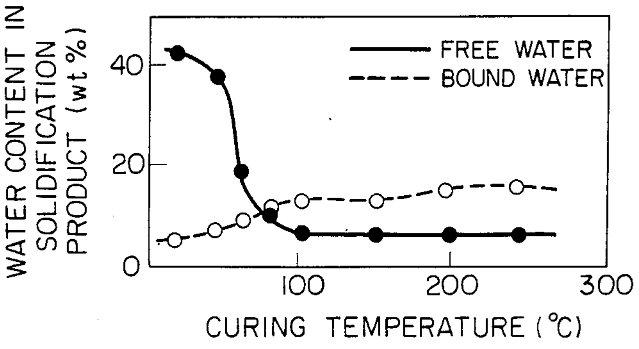
FIG. 1 is a graph showing a relationship between the curing temperature and the water content in the solidified products prepared from a solution of sodium silicate under the saturated steam condition.

This invention will now be described by way of its preferred embodiments.

A solution of alkali silicate is an aqueous solution of compound comprising an alkali such as sodium and silicic acid, generally referred to as water glass, in which the molecular ratio of silicic acid to the alkali may optionally be varied over a wide range. Any acid stronger than silicic acid liberates silicic acid from the solution of alkali silicate to form molecules of free $H_2SiO_3$ which further form greater molecules $(H_2SiO_3)n$ and cause polymerization or condensation through the release of water to gel and cure. While the acid reaction as described above is generally utilized for the gelation of the solution of the alkali silicate, the present inventors have experimentally found that the gelling reaction of the solution of alkali silicate can also be caused by the ions of metal elements other than alkali metals. Table 1 shows the occurrence of reaction between the solution of sodium silicate and metal ions applied thereto in the form of nitrate solution.

TABLE 1

Reaction between metal ions and sodium silicate

| Ion carrier | Metal ion | | | | | | | | |
|---|---|---|---|---|---|---|---|---|---|
| | Na | Cs | Ca | Sr | Fe | Cr | Zr | La | Ce |
| Nitrate solution | x | x | o | o | o | o | o | o | o |

o: gelled
x: not gelled

While the details for the reaction mechanism have not yet been clear at present, it may be considered that the polymerization is proceeded triggered by the formation of a metal silicate compound formed through the reaction of the metal element and the silicic acid molecule. While the rate of the curing reaction caused by the metal element ion is different depending on the kind of the ion, if the metal ion is reacted in the form of an aqueous solution of metal salt with the solution of alkali silicate, the reaction proceeds at an extremely high rate to result in a difficulty for the formation of homogeneous solidification product. In order to prevent excessively rapid reaction between the solution of alkali silicate and the metal ion, slow leaching of metal ions from a soluble salt, or detaching of the ions from ion adsorbing material may be utilized. In addition, metal ions detached from the surface of a solid compound containing the metal in the course of the reaction such as hydrating reaction with water or the like may also be utilized. While most of the leaching or hydrating reactions are generally proceeded at an extremely low rate or do not proceed substantially under normal temperature, in the case of curing at high temperature as employed in the process according to this invention, the reaction is actually resulted and such material as mentioned above can be used as the curing agent. In the use of the less water soluble material as the curing agent, if the curing agent remains not reacted after the curing reaction, it does not degrade the performance of the solidification product because of its excellent stability. The curing agent usable herein can include those inexpensive and highly stable materials such as carbonates and silicates of alkaline earth metals and compounds of aluminum or iron with alkaline earth metal salts.

However, the reaction between the above-mentioned materials and the solution of alkali silicate is slow at the normal temperature and takes too much time for the completion of the reaction. In addition, a so-called curing shrinkage is resulted in which the distance between each of the gel-forming particles is continued to reduce for a long period of time after the gelation. Further, if the water content is evaporated from the surface of the gelled product, dry shrinking occurs. If such shrinking is resulted unevenly, cracks are liable to be developed. Further, in a case where solid matters such as radioactive solid wastes are present together, cracks are more liable to be resulted due to the uneven shrinkage. Such curing shrinkage and drying shrinkage can be prevented by rapidly removing the water content after the curing reaction. Although a method of promoting the evaporation of the water content through heating or pressure reduction during curing reaction is effective for the removal of the water content, this may form open pores of about 10–500 Å to the surface of the solidification product along with the evaporative removal of the water content, whereby water or gaseous components are liable to intrude through the open pores into the solidification product to impair the durability thereof.

Furthermore, if defects such as pores or cracks are present in the solidification product, the destruction strength of the solidification products is reduced and, accordingly, formation of such defects is undesired in view of the mechanical properties of the solidification product.

The present inventors have made a study on a process for overcoming the problems involved in the solidification product prepared by curing the solution of alkali silicate and, as the result, has found that it is effective to carry out heating under the condition of a high humidity nearly equal to the saturated steam condition.

The advantageous effects of the heat cure under the highly humid condition can include the followings.

(1) Promotion of the curing reaction under heating.

(2) Suppression of water evaporation due to the stabilization of the water content through the hydrating reaction and the saturation of the water content caused by the heating.

The effect (1) can be attained by proceeding the reaction at a high temperature, where the reaction which would hardly be proceeded at the normal temperature can be completed within a short time. This, coupled with the synergistic effect for the stabilization of the water content due to the hydrating reaction or the like, can prevent the generation of cracks which would otherwise be resulted accompanying the progress of the reaction over a long period of time as experienced in the water setting solidifying agent such as cement. Further, at such a high temperature, those reactions difficult to be proceeded at the normal temperature can also be caused. Particularly, since the reaction is put under the hydrothermal reaction condition, the reaction is promoted and it is possible to select the reaction system such that the material readily forming a water soluble salt such as an alkaline component in the alkali silicate can be bonded in the silicate and settled.

Further, according to the effect (2), the free water as the colloidal particular medium in the water setting solidifying material can be stabilized in the form of the bound water and the evaporation of the water content can be prevented under the highly humid condition, to thereby prevent the formation of open pores caused by the removal of water through evaporation before the curing. Most of the silicate compounds form hydrates through heating under the presence of water. Therefore, in the case of using a silicate compound as the curing agent, hydrating reaction is caused in addition to the curing effect to stabilize the water content in the solidification product. This may be attained likewise in the case of selecting other curing agent liable to cause hydrating reaction. Furthermore, similar effect can also be obtained even by the use of a curing agent not causing hydrating reaction, if material liable to cause the hydrating reaction is added together.

FIG. 1 shows one example for the result of experiment in which the changes in the amount of free water and bond water were measured where barium silicate was used as the curing agent for the solution of sodium silicate and calcium silicate was added as the material liable to cause hydrating reaction, under the saturated steam condition while varying the curing temperature. The effect of removing free water by heating is remarkable at a temperature higher than 60° C. and the water content in the solidification product is almost constant above 100° C. The foregoing result shows that a temperature condition above 100° C. is necessary for the removal of free water, and the necessary temperature condition for the removal of free water undergoes no substantial effect by the type of the curing agent. While on the other hand, in order to suppress the formation of the open pores resulted upon evaporating escape of the water content, a certain amount of free water has to be stabilized in the form of bound water through the hydrating reaction. The temperature condition at which the hydrating reaction is caused effectively is different depending on the incorporated material that causes hydrating reaction. Although a significant formation of bound water is recognized from the temperature of about 100° C. under the condition shown in FIG. 1, it has been found that a temperature condition of about 200° C. is required in order to completely suppress the formation of the open pores. However, the temperature condition for completely suppressing the formation of the open pores may be moderated by using material more liable to cause the hydrating reaction. However, in the case of using such material as causing a rapid hydrating reaction at lower temperature, it may possibly deprive the water content out of the solution of alkali silicate rapidly to impede the homogeneous curing reaction. In view of the above, it is desired to select such material that causes a remarkable hydrating reaction under the temperature condition above 100° C. at which the removal of free water can be proceeded effectively through the hydrating reaction.

Figure 2:
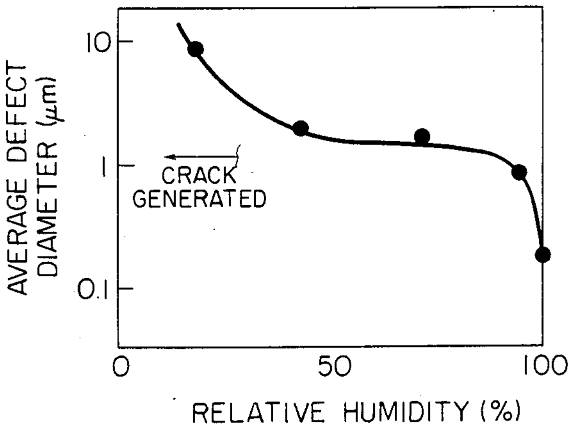
FIG. 2 is a graph showing a relationship between the relative humidity and the average diameter of defects contained in solidified products prepared from a solution of sodium silicate under the condition of curing temperature at 200° C., FIG. 3 schematically shows one example of solidification products prepared by solidifying radioactive wastes by using a solution of alkali silicate as the solidifying material and an alkaline earth metal as the curing agent, in which FIG. 3(*a*) is an entire view, and FIGS. 3(*b*) and (*c*) are, respectively, enlarged views for the portion A in FIG. 3(*a*)

FIG. 2 shows a relationship between the relative humidity upon curing and the average diameter of defects in a case where the same material as in FIG. 1 was used and the temperature condition was set to 200° C. As shown in the graph, as the relative humidity lowers from 100%, the average defect diameter is rapidly increased and under the condition of the relative humidity less than 50%, generation of cracks due to the rapid drying was observed. As apparent from the foregoing result, it is necessary to apply heating under the condition nearly to that of 100% relative humidity, that is, the saturated steam conditions in order to suppress the formation of the open pores.

It can be seen from the foregoings that solidification products with excellent water proofness or the like can be produced while preventing the formation of defects that present undesired effects on the soundness of the solidification products, by using a solution of alkali silicate, adding thereto an appropriate curing agent and, as required, such material as liable to cause hydrating reaction, and heating them to a temperature above 100° C. under the saturated steam condition.

Figure 3A:
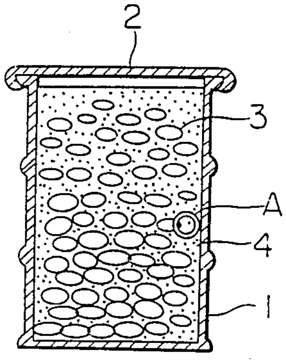
Figure 3B:
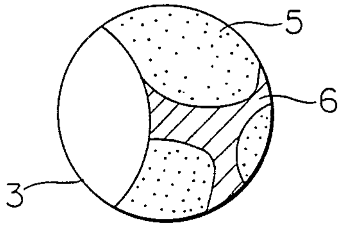
Figure 3C:
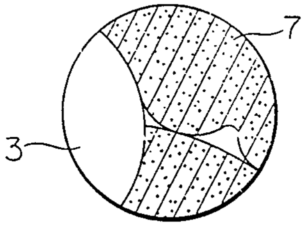

FIG. 3 shows one embodiment of the solidification product prepared by solidifying radioactive wastes using a solution of alkali silicate as the solidifying material and an alkaline earth metal as the curing agent. In FIG. 3(*a*), are shown a drum can 1, a cover 2, pelletized radioactive wastes 3 and solidifying material 4 that solidifies the radioactive wastes 3. FIGS. 3(*b*) and (*c*) are, respectively, enlarged views for the portion A in FIG. 3(*a*), in which FIG. 3(*b*) shows the solidification product solidified by the conventional process and FIG. 3(*c*) shows the solidification product solidified by the process according to this invention. In FIG. 3(*b*), the solution of alkali silicate and the alkaline earth metal are cured through reaction and present as an alkaline earth metal silicate compound 5 (referred to as $(RO)_n.SiO_2$), where R represents an alkaline earth metal element which may partially be replaced with other elements. Further, water contained in the solution of alkali silicate is present as free water ($H_2O$) 6 between the particles of the alkaline earth metal silicate compound 5. The free water 6 gives various undesired effects on the solidification product.

FIG. 3(*c*) shows the solidification product according to this invention produced by curing under the high temperature and high humidity condition in which no free water is present as shown in the figure, because water in the solution of alkali silicate is reacted with the alkaline earth metal silicate compound ($(RO)_n.SiO_2$) to form the hydrate 7 represented by $(RO)_n.SiO_2.mH_2O$.

Thus, free water is bound into a stable hydrate in this invention. Further, since volume expansion is resulted due to the hydrating reaction according to this invention, the defects in the solidification product are constrained to decrease. Moreover, since hydration has sufficiently been taken place, if free water intrudes subsequently, no substantial reaction occurs therewith and there is less effect from other chemical material. In this way, stable solidification product can be formed also in the case of solidifying material resulted from the reaction of the solution of alkali silicate.

While the alkaline earth metal silicate can also be obtained through sintering at an extremely high temperature other than the curing reaction of the solution of alkali silicate as described above, it is desired to start from the solution of alkali silicate and perform the curing reaction therefor in view of the cost and the ease of procedures.

There can be mentioned various kinds of combination between the curing agent for the solution of alkali silicate and material liable to cause the hydrating reaction. Among them, calcium silicate compounds are suitable as the curing agent and the material liable to cause the hydrating reaction in view of the cost, ease of availability and the stability of the resulted solidification product. As the solution of alkali silicate, solution of sodium silicate is most appropriate in view of the cost for the solidification product since it is less expensive and readily available. The calcium silicate compound take various forms of crystals depending on the Ca/Si ratio, synthetic conditions or the like. Table 2 shows the enthalpy for the hydrating reaction of typical calcium silicates and calcium oxide.

TABLE 2

| Change in the enthalpy in the hydrating reaction of calcium silicate compound and calcium oxide | |
|---|---|
| Compound | $\Delta H_{298}$ (Kcal/molCa) |
| CaO | −15.58 |
| $Ca_3SiO_5$ | −8.08 |
| $\beta$-$Ca_2SiO_4$ | −3.34 |
| $\gamma$-$Ca_2SiO_4$ | −2.94 |
| $CaSiO_3$ | +3.47 |

As apparent from Table 2, those compounds with the Ca/Si ratio greater than 1 other than calcium silicate ($CaO.SiO_2$) show negative enthalpy change and cause hydrating reaction even at normal temperature. However, according to H. F. W. Taylor (The chemistry of Cement, P. 301, Academic Press (1964)), it takes for about one year in the case of $(CaO)_3SiO_2$ to complete the hydrate reaction and the hydrating ratio can reach only about 80% even one year after for $\beta$—$(CaO)_2.SiO_2$. While on the other hand, those materials such as CaO with greater enthalpy change react so violently with the solution of sodium silicate that they bring about a difficulty in forming homogeneous solidification product.

Figure 4:
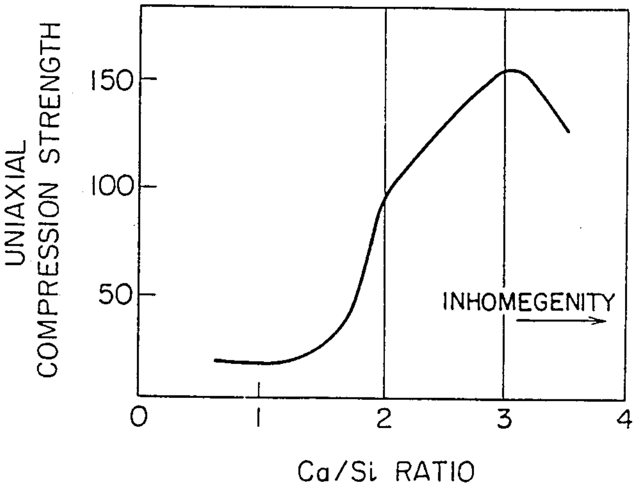
FIG. 4 is a graph showing the change in uniaxial compression strength of solidification products prepared by using sintered calcium silicate compounds with varying Ca/Si ratio as the curing agent and cured under the condition of 150° C. and the saturated steam condition.

FIG. 4 shows the change in the uniaxial compression strength where the solution of sodium silicate is cured at 150° C. and under the saturated steam condition by using calcium oxide and silicic acid sintered at 1400° C. while varying the Ca/Si ratio as the curing agent. Development of the strength of the solidification product is recognized at about Ca/Si=2 and the strength is improved together with the ratio till about Ca/Si=3. However, if the Ca/Si ratio is increased further, effect of inhomogenity becomes remarkable. $Ca_3SiO_5$ generally referred to as alite is formed at Ca/Si=3 and $Ca_2SiO_4$ generally referred to as belite is formed at Ca/Si=2. These calcium silicates liberate excess CaO as $Ca(OH)_2$ in the course of the hydrating reaction. Since $Ca(OH)_2$ functions as the curing agent and forms a stable calcium silicate compound, the compounds are appropriate as the curing agent and can be used with ease. Particularly alite has a significant effect of developing the strength and is excellent as the curing agent.

Figure 5:
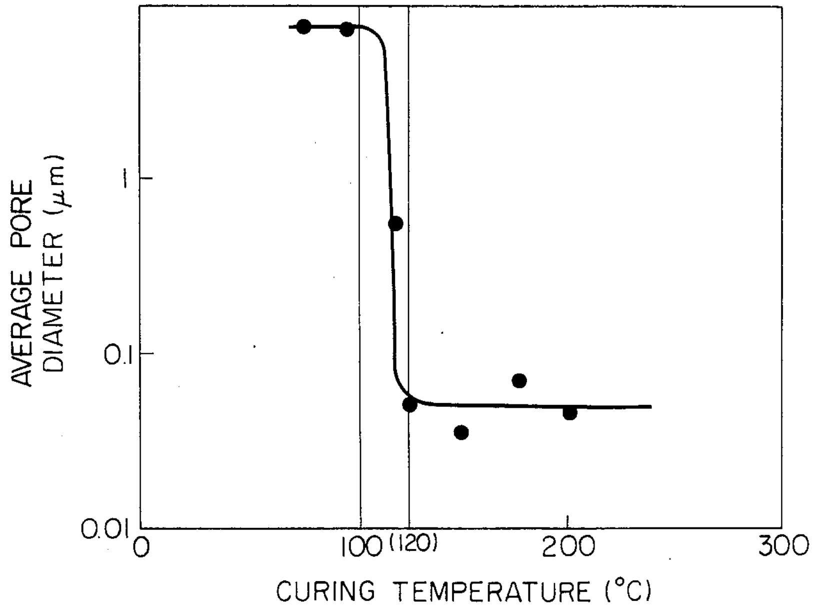
FIG. 5 is a graph showing a relationship between the average diameter of the defects resulted in the solidification products and the curing temperature when a solution of sodium silicate is cured through heat treatment by using alite powder as the curing agent under the saturated steam condition.

FIG. 5 shows the average pore diameter in a case where alite is added as the curing agent to the solution of sodium silicate at a ratio of 100:60. The average pore diameter is decreased as the temperature goes higher than about 100° C. and the formation of the large diameter pores is not recognized under the temperature condition of higher than 120° C. Correspondingly, the strength is improved and, as shown in FIG. 6, a large strength is shown under the temperature condition higher than 100°–120° C.

While on the other hand, since calcium silicate does not cause hydrating reaction at the normal temperature as can be seen from the positive enthalpy change, or it liberates no $Ca(OH)_2$ even when it causes the hydrating reaction, the calcium silicate does not act effectively as the curing agent. However, since it causes the hydrating reaction at a high temperature, the material can be used for stabilizing water by utilizing the hydrating reaction. This reaction can be utilized by adding other material as the curing agent.

Figure 6:
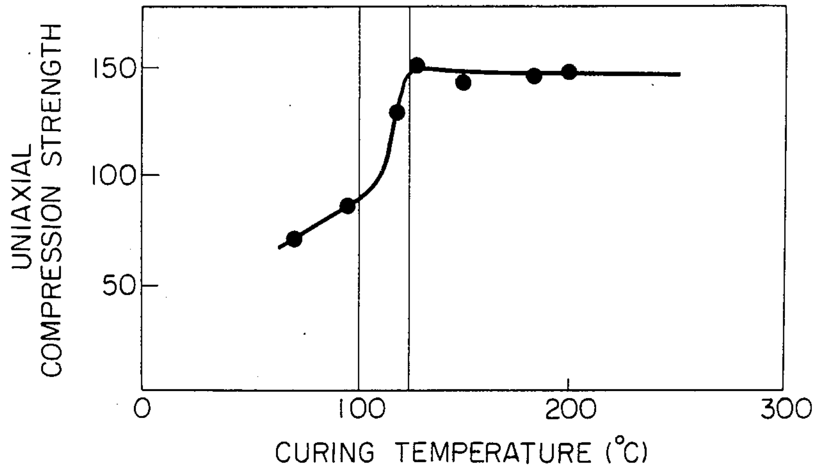
FIG. 6 is a graph showing a relationship between the curing temperature and uniaxial compression strength of solidification products prepared in the same manner as FIG. 3.
Figure 7:
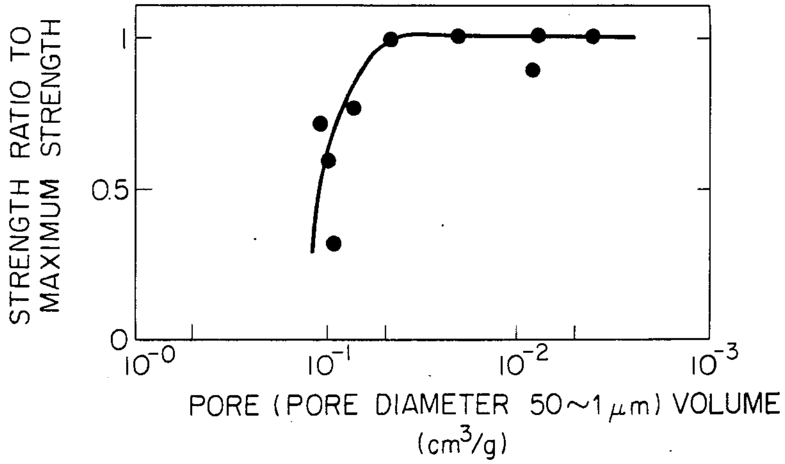
FIG. 7 is a graph showing a relationship between the volume of pores in the solidification products with the pore size ranging between 50–1 μm and the strength ratio to the maximum strength in the solidification product of the same composition.

As can be seen from FIG. 5 and FIG. 6, pores formed in the solidification product have a close concern with the strength of the solidification product. The pores in the solidification product are resulted from various factors and different with their shapes and sizes. Among them, those pores with diameter of larger than 50 $\mu$m are considered to be derived from air bubbles deposited to the starting material. They are spherical in the shape and provide almost no effects onto the strength so long as their density is kept low. While on the other hand, those pores with smaller pores diameter are derived from gaps between the solidification product-forming particles, and they are classified into those with the particle size up to the size of the pulverized particles (about 50–1 $\mu$m) and those derived from the fine structure of the constituent particles (less than 1 $\mu$m). Based on the expectation that the strength of the solidification product is mainly concerned with the pores derived from the gaps between the solidification product-constituting particle, an experiment was carried out. The result of the experiment is as shown in FIG. 7. In the figure, the abscissa represents the total volume (pore volume) of the pores with the diameter between 50–1 $\mu$m among the pores in the solidification product and the ordinate represents the ratio of the strength of the solidification product of each pore volume relative to the solidification product with the maximum strength among the products having the same composition as that described above. As can be seen from the figure, it is possible to increase the strength of the solidification product approximately to the maximum value irrespective of the composition by decreasing the pore volume for the pores with 50–1 $\mu$m diameter to less than 0.05 $cm^3/g$. The gap between the particles can be decreased due to the hydration of the solidification product-constituting particles and the pore volume can be adjusted to less than 0.05 $cm^3/g$ by controlling the amount of the curing agent added and the curing condition, whereby the development of a sufficient strength for the solidification product can be expected.

Figure 8:
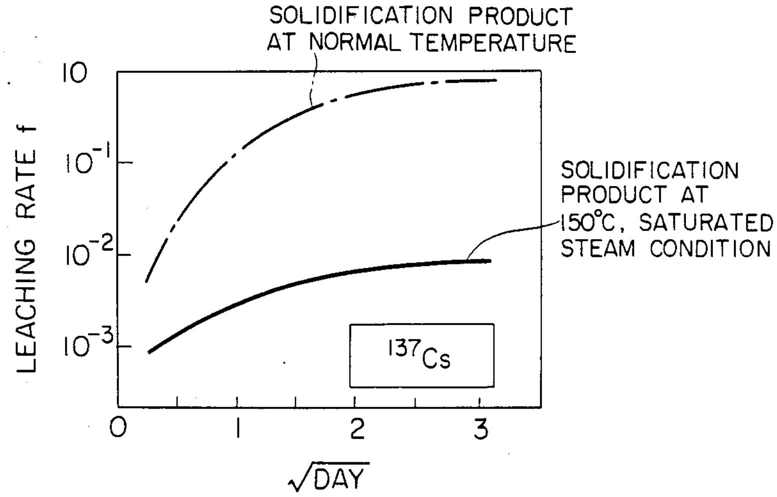
FIG. 8 is a graph showing the radioactivity leaching rate in compression between the solidification product cured under the normal temperature and the solidification product cured at 150° C. under the saturated steam condition each by using alite.

FIG. 8 shows the aging change in the leaching ratio of radioactivity when measured by using $^{137}Cs$ as the tracer. In the figure, the solid line represents the solidification product according to this invention prepared at 150° C. under the saturated steam condition and the dotted chain represents the solidification product prepared by a conventional process by curing at the normal temperature. As can be seen from the figure, leaching of radioactivity into water can be suppressed by using the process according to this invention.

While the explanations have been made to the case of using calcium silicate compounds, these calcium silicate compounds form essential components in cement materials such as portland cement and blast furnace slag cement. Particularly, alite is contained by as much as 40–70% in the cement. Accordingly, the cement can be used as the curing agent.

Further, alkaline earth metal elements other than calcium form similar compounds, which may also be utilized as suitable curing agent. In addition thereto, those materials that release metal elements other than alkali earth metals or acids upon dissolution into water or other chemical reactions can also be used as the curing agent and, by adding an appropriate material causing hydrating reaction as required, the process according to this invention can be practiced. Selection of the material should be made considering the physical properties required for the solidification products, reaction conditions and the cost.

Explanation will then be made for the method of attaining the high humidity condition as the essential factor in the process according to this invention. As has already been explained with respect to FIG. 2, heating under the condition nearly equal to the saturated steam condition is required for attaining the purpose of this invention. However, the saturated steam condition is not always necessary over the entire period of heating and open pores can be suppressed only if the saturated steam condition can be reached prior to the stage where the defoaming becomes difficult along with the progress of the curing reaction. The method of attaining the saturated steam condition includes a method of blowing steams saturated at a certain temperature to solidification product in a pressure vessel or method of introducing excess water together with the solidification product in a pressure vessel and heating them as they are in a tightly closed system. Further, as the source of the steams, the water content in the solution of alkali silicate, curing agent and/or radioactive wastes may be utilized and they are heated while being tightly closed in the vessel, by which the construction of the apparatus can be facilitated. For practicing the method, it is necessary to provide a pressure proofness and a sealing performance to the container for solidification product such as a drum can. However, the saturated steam pressure is only about 3 atm at a temperature of about 150° C. and there is no requirement for large and complicated apparatus by selecting the reaction system in which reaction is proceeded at a temperature lower than the above. In order to moderate the burden in view of the apparatus, it is better to select the reaction system in which the reaction can be proceeded at a temperature as low as possible.

Figure 9:
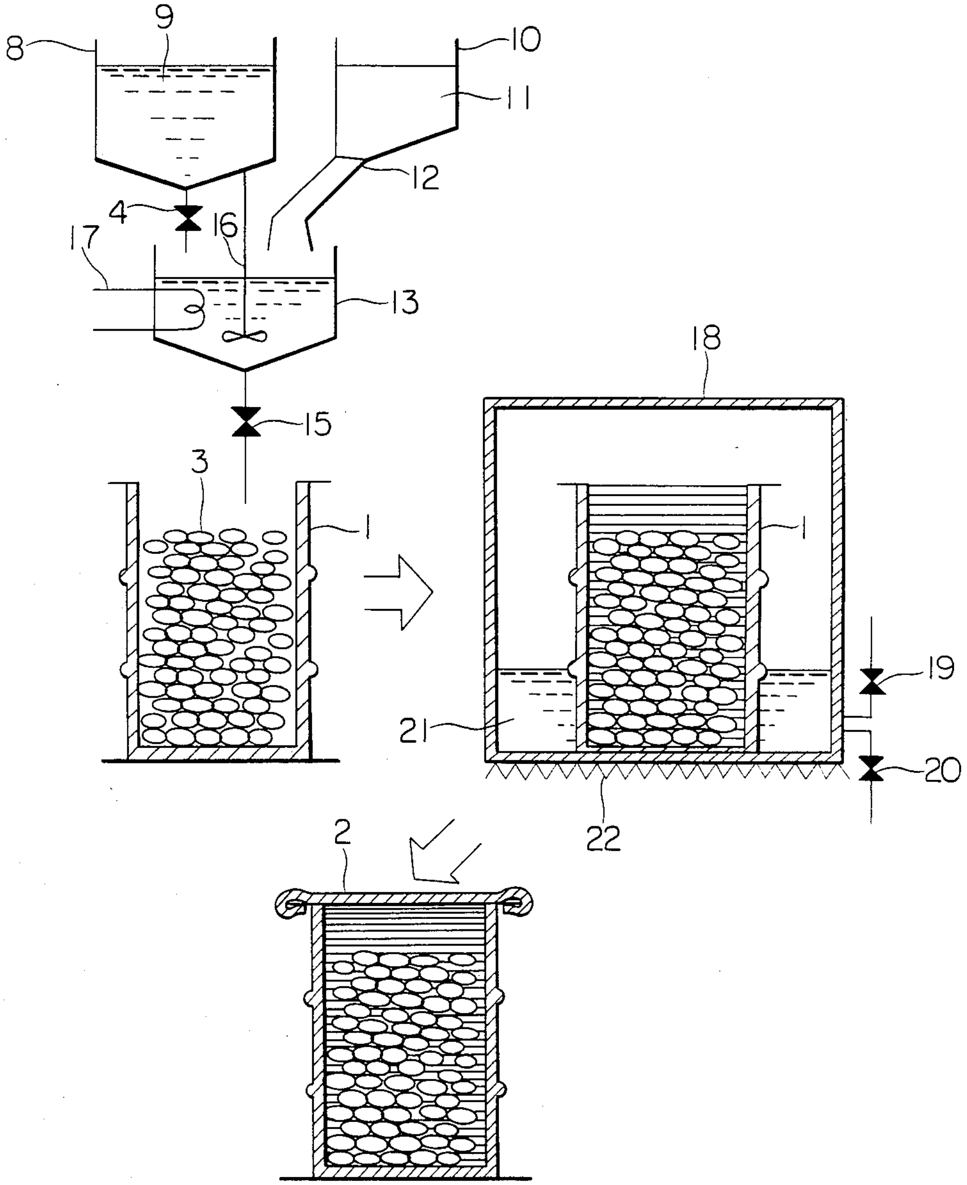
FIG. 9 and FIG. 10 are respectively schematic views for different embodiments of the device for preparing the solidification products according to this invention.

One embodiment of the apparatus for practicing this invention will now be described referring to FIG. 9. This embodiment concerns a device for disposing concentrated liquid wastes mainly composed of sodium sulfate discharged from BWR type nuclear power plants, which have been dried and powderized and then pressmolded under pressure into pellets. Such pelletized radioactive wastes are stabilized stably in a drum can by the solidifying process according to this invention.

At first, pelletized radioactive wastes 3 are filled in a drum can 1. Sodium silicate solution 9 is stored in a solidifying agent tank 8. Alite powder 11 is stored in a curing agent tank 10. The curing agent tank 10 is in communication by way of a valve 12 with a mixing tank 13. Further, the solidifying agent tank 8 is adapted to supply the sodium silicate solution 9 by way of a valve 14 to the mixing tank 13.

After closing a valve 15 connected to the mixing tank 13 for supplying the solidifying material to the drum can 1, the valve 14 is opened to supply the sodium silicate solution 9 from the solidifying material tank 8 into the mixing tank 13. Then, the valve 12 is opened to supply the alite powder 11 into the mixing tank 13, and it is mixed with the sodium silicate solution at a rate of 100:30 by a stirrer 16. A cooler 17 is disposed to the mixing tank 13 to maintain the temperature within the mixing tank 13 to less than 10° C. so that rapid reaction and solidification of the alite powder and the sodium silicate solution may be prevented to thereby keep the mixed solution at a low viscosity. Then, the valve 15 is opened to supply the liquid mixture within the mixing tank 13 into the drum can 1. In this case, it is necessary to control the temperature and the mixing time in the mixing tank 13 so as to keep the viscosity of the liquid mixture from increasing excessively in order that the liquid mixture can intrude passing through the gaps between the pelletized radioactive wastes 3.

After the drum 1 has been completely filled with the solidifying material, the drum can 1 is transferred into a pressure-proof heating container 18. The pressure-proof heating container 18 is in communication by way of a valve 19 with a purified water supply port and by way of a valve 20 to a water drain port. At first, after closing the valve 20, the valve 19 is opened to supply purified water to the inside of the container 18 so that water 21 may be filled to the outside of the drum can 1. Then, the valve 19 is closed and the heater 22 appended to the pressure-proof heating container 18 is actuated to maintain the temperature inside of the pressure-proof container 18 to 120° C. thereby evaporating water 21 to attain the saturated steam condition.

After the solidifying material has been cured completely, the temperature is cooled down to the normal temperature and the valve 20 is opened to drain the water. Thereafter, the temperature inside of the pressure-proof heating container 18 is increased to about 80° C. by using the heater 22 to dry the drum can and the solidifying agent. After the drying has been completed, the drum can 1 is taken out from the pressure-proof heating container 18, attached with a cover 2 and then transported to and stored in a storing site.

The solidification products obtained in this way contain no significant defects as shown in FIG. 3(*c*) and produce no defects such as cracks even after long time storage. Accordingly, even when the drum can 1 should be damaged by corrosions or the likes and can no more function as the barrier against the leaching of radioactivity into water, the solidification products produced according to this invention have a sufficient suppression effect for the leaching of radioactivity.

According to the foregoing embodiment, the pelletized radioactive wastes mainly composed of sodium sulfate can be immobilized stably for a long period of time in the solidification products without imparing the soundness of the pellets.

Figure 10:
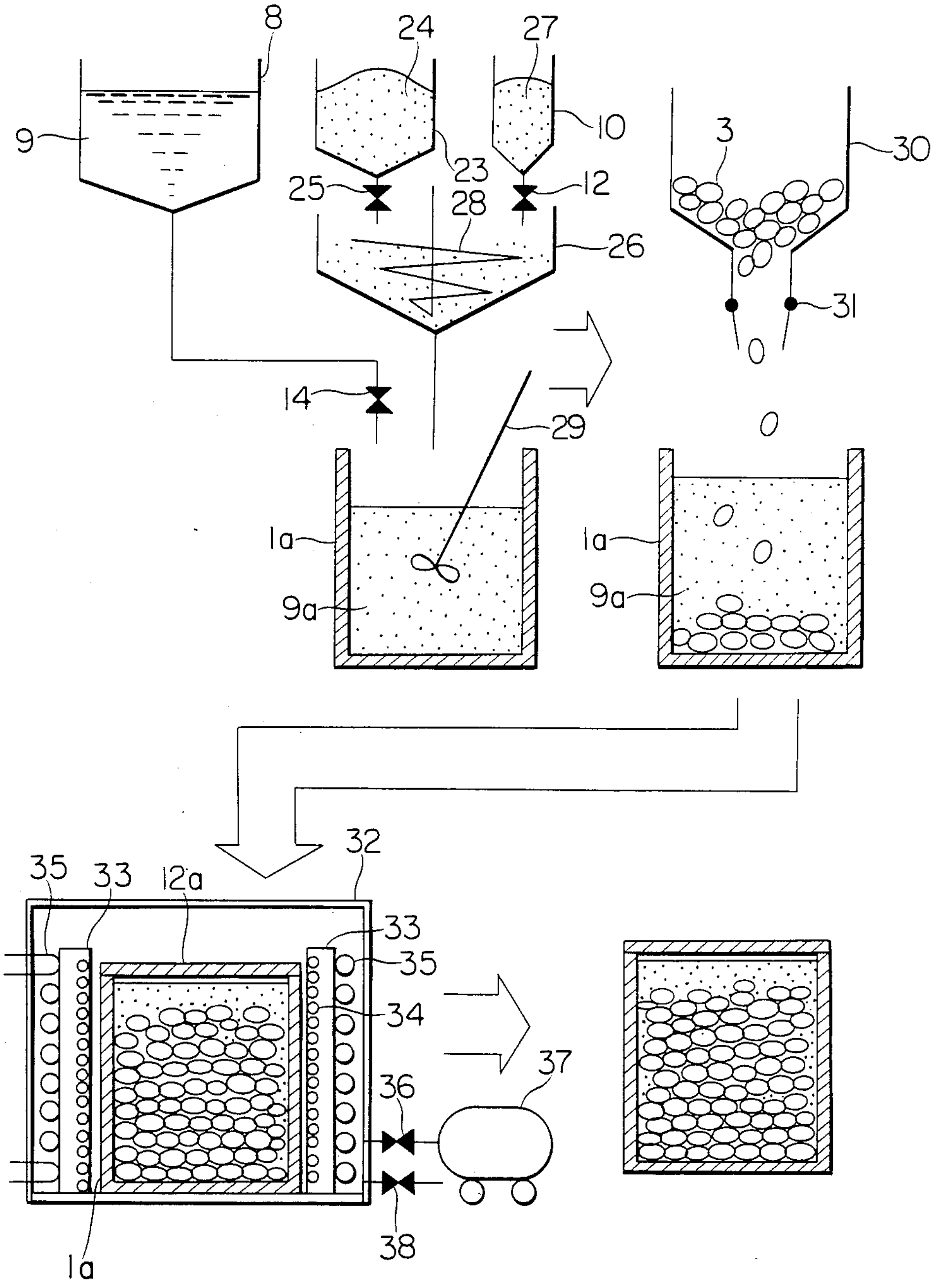
Figure 11:
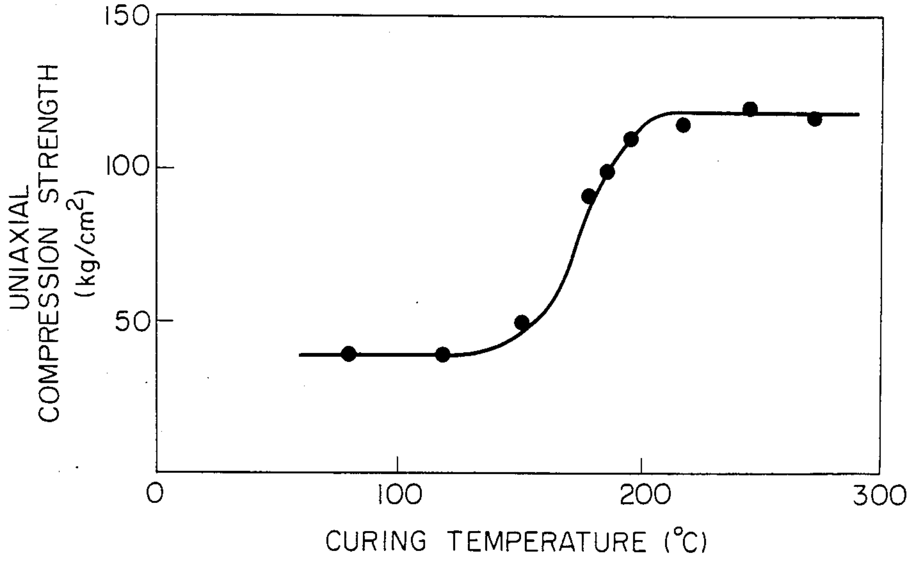
FIG. 11 is a graph showing a relationship between the curing temperature and uniaxial compression strength in the solidification product of a composition different from that in FIG. 6.

Another embodiment of this invention will then be explained referring to FIG. 10. This embodiment also concerns the immobilizing of pelletized radioactive wastes and it has a particular object of modifying the solidification products into more chemically stable material by the treatment at a higher temperature.

A sodium silicate solution 9 is stored in a solidifying material tank 8 such that the sodium silicate solution 9 may be supplied by way of a valve 14 into a radioactive waste container 1*a*. A calcium silicate powder ($CaSiO_3$) 24 is stored in a hydrating agent tank 23, which is connected by way of a valve 25 to a mixing tank 26. Portland cement 27 is stored in a curing agent tank 10, which is connected by way of a valve 12 to the mixing tank 26. At first, the valve 14 is opened to supply the sodium silicate solution 9 to the radioactive waste container 1*a*. Then, the valves 25 and 12 are opened to supply calcium silicate powder 24 and portland cement 27 into the mixing tank 26, mixed at a ratio 10:1, supplied by means of a feeder 28 to the radioactive container 1*a* and then mixed by means of a stirrer 29. In this case, if an excess amount of calcium silicate is mixed, the curing agent is diluted to retard the proceeding of the curing reaction. Further, since it can react with and stabilize the residual sodium silicate not reacted upon subsequent heating treatment, the amount of the curing agent added may be small. This effect can also prevent the rapid advance of the curing reaction thereby provide a margin for the time required for charging them into the waste container 1*a*.

Then, pelletized radioactive wastes 3 stored in an intermediate radioactive waste store tank 30 are charged by opening a valve 31 disposed thereto into the container 1*a*. In this case, it is necessary that the pellets have to be charged completely before the curing of the solidifying material 9*a* in the container 1*a* proceeds so much. It will be also effective to cool the radioactive waste container 1*a* in order to retard the advance of the curing reaction.

After the pelletized radioactive wastes 3 have been charged completely into the radioactive waste container 1*a* the container is tightly sealed with a sealing cover 2*a* and then transported into a pressure-proof container 32. The pressure-proof container 32 is disposed with a heating furnace 33, in which the radioactive container 1*a* is placed. A heater 34 is disposed to the inside of the heating furnace 33. Further, a cooling device 35 is disposed to the outer wall of the heating furnace 33 so that the temperature at the outer wall of the heating furnace 33 does not exceed 100° C. during heating. The pressure-proof container 32 is in communication by way of a valve 36 to a compressor 37 and by way of a leak valve 38 to the external atmosphere. At first, after closing the leak valve 38, heating for the radioactive waste container 1*a* is started by using the heater 34. In this case, the valve 36 is opened to supply a pressurized air by using the compressor 37 to the inside of the pressure-proof container 32 so that the pressure within the pressure-proof container 32 is always higher by about 1 atm than the inner pressure of the radioactive waste container 1*a*. Water content of the sodium silicate solution in the radioactive waste container 1*a* is evaporated under heating to increase the pressure inside of the radioactive waste container 1*a*. However, since the container is pressurized from the outside, it does not deform by the inner pressure and the sealing performance with the sealing cover 2*a* can be maintained with ease since the external pressure is controlled somewhat higher. When the heating temperature arrives at 200° C., the temperature is kept as it is for about 5 hours. Since the radioactive waste container 1*a* is tightly sealed, water evaporated from the solidifying material 9*a* provides the saturated steam condition. FIG. 10 shows a relationship between the uniaxial compression strength of the solidification product and the heat treating temperature under the saturated steam condition in the case of calcium silicate, in which a significant increasing effect for the strength can be recognized by the heating at a temperature higher than 200° C. It is considered that the calcium silicate is somewhat less reactive. As the result of X-ray diffractiometry, the calcium silicate shows no substantial change up to the temperature of about 200° C. but transforms into a calcium-sodium silicate hydrate at a temperature higher than 200° C. This means that the calcium silicate reacts with sodium silicate as well as causes hydration. Since sodium silicate takes a glass-like state under the anhydrous condition and exhibits relatively high water solubility, if the amount of the curing agent is decreased as in this embodiment, it remains unreacted as it is to provide a problem in view of the water-proofness. By increasing the temperature to above 200° C. while adding calcium silicate, the sodium silicate reacts with calcium silicate to be stabilized. However, since the saturated steam pressure at 200° C. is as high as about 17 atm, if the final solidifying container is used also as a tightly sealed container for attaining the saturated steam condition, the pressure proofness of the container has to be increased. In this embodiment, since an external pressure is applied, a container of lower pressure-resistance may also be used.

After the curing reaction has been completed, the heater 34 is disconnected to allow cooling and, simultaneously, the valve 36 is closed and the leak valve 38 is opened to decrease the pressure. Also in this case, pressure control is effected such that there is no significant difference between the pressure in the pressure-proof containers 32 and the pressure inside of the radioactive waste container 1*a*. When the temperature decreases nearly to the room temperature, the radioactive waste container 1*a* is taken out from the pressure-proof container 32 and then transported to and stored in a storage site.

According to this embodiment, pelletized radioactive wastes can be settled into a stabilized form with ease while preventing inhomigenity in the product by decreasing the amount of curing agent.

Figure 12:
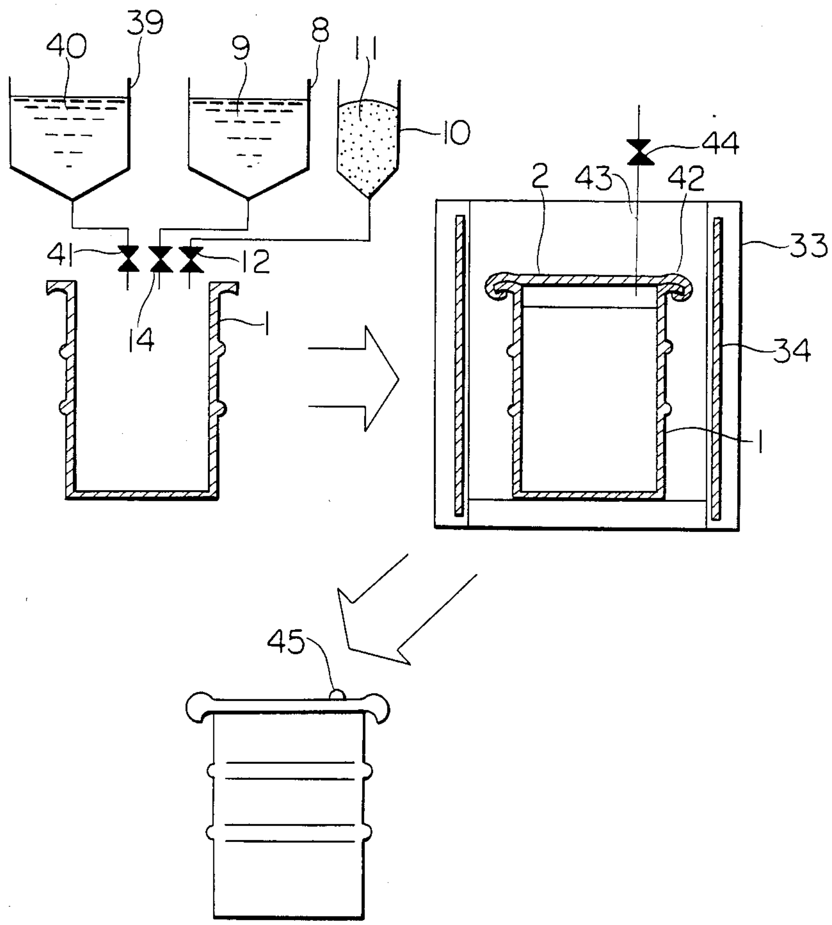
FIG. 12 is a schematic view for a further embodiment of the device for preparing the solidification products according to this invention.

A still further embodiment according to this invention will now be described next referring to FIG. 12. This embodiment concerns solidification of radioactive liquid wastes mainly composed of boric acid discharged from PWR type nuclear power plants, in which the liquid wastes are solidified directly in a drum can as in the liquid state not by way of powderizing or drying process.

Concentrated boric acid liquid wastes 40 are stored in a radioactive liquid waste tank 39. A sodium silicate solution 9 is stored in a solidifying agent tank 8. Alite powder 11 is contained in a curing agent tank 10. The radioactive liquid wastes tank 39, the solidifying agent tank 8 and the curing tank 10 are in communication with a drum can by way of valve 41, valve 14, valve 12 respectively. The boric acid liquid wastes, the sodium silicate solution and the alite powder are supplied each by a predetermined amount to the drum can 1 by opening valves 7, 8, 9 respectively and then agitated together. Thereafter, a cover 2 is placed on a drum can. The drum can 1 and the cover 2 are closely sealed by means of a heat resistant packing material 42. Since it is sufficient for the heat resistant packing material 42 to withstand the temperature of about 120° C., the material usable herein may include various materials such as fluoro resins or teflon. A leak pipeway 43 is attached to the cover 14 for exhausting the gas within the drum can by way of a leak valve 44. The leak valve 33 is left opened initially and the drum can 1 is placed within a heating furnace 11 in this state. A heater 34 is disposed to the heating furnace 33 and the drum can is at first heated to 80° C. by using the heater 34 and excess water is drained passing through the leak pipeway 43. Then, the drum can is heated to 120° C. and maintained there while closing the leak valve 44. Since the inner pressure of drum can 1 is increased to about the saturated steam pressure, the tight seal for the drum can 1 is made so as to withstand the pressure of this extent. After the solidifying agent has been cured, the temperature is decreased to 80° C. Then the leak valve 44 is opened to decrease the inner pressure of the drum can to a normal pressure and water condensated within the drum can is expelled. Thereafter, the temperature is decreased to normal temperature and the drum can 1 is taken out from the heating furance 33, removed with the leak pipeway 43, tightly sealed with a seal plug 45 and then transported to and stored in a storage site.

According to this embodiment, radioactive liquid wastes can be settled with ease in the form of stable solidification products without powderizing and drying steps.

Although the explanations have been made in each of the foregoing embodiment for the process of producing solidification products by using the alkali silicate solution and adding the curing agent thereto, solidified radioactive wastes may also be produced by forming an alkaline earth silicate compound in another method (for example, sintering at high temperature), and solidifying the radioactive wastes at high temperature and high humidity condition by using the alkaline earth silicate compound as the solidifying agent.

As described above, according to this invention, solidified radioactive wastes with less development of defects such as open pores and cracks can be obtained and radioactive wastes can be settled into solidification products excellent in strength and radioactivity retaining performance.

What is claimed is:

1. A process for producing solidified radioactive wastes by covering and immobilizing radioactive wastes with solidifying material, comprising:
   - mixing a solution of alkali silicate, a curing agent for curing said solution of alkali silicate and radioactive wastes with each other to form a mixture; and
   - thereafter, heating the mixture to a temperature of about 100 degrees C or higher while maintaining the mixture in a high humidity environment of at least substantially saturated steam thereby curing said solution of alkali silicate to obtain solidified radioactive wastes without substantial vaporization of free water within the mixture that would cause undesirable pores and like defects.

2. The process for producing solidified radioactive wastes as defined in claim 1, wherein the curing agent is an alkaline earth metal compound.

3. The process for producing solidified radioactive wastes as defined in claim 2, wherein during said heating, reacting the alkaline earth metal compound in a hydrating reaction with the water content in the solution of alkali silicate to bond the water as a hydrate.

4. The process for producing solidified radioactive wastes as defined in claim 2, wherein the heating is carried out at a temperature between 120°–130° C.

5. The process for producing solidified radioactive wastes as defined in claim 2, wherein the radioactive wastes are obtained from radioactive liquid wastes by drying and powderizing them and then molding into pellets.

6. The process for producing solidified radioactive wastes as defined in claim 1, wherein the curing agent is a silicate compound.

7. The process for producing solidified radioactive wastes as defined in claim 1, wherein said step of mixing admixes, as a part of the misture, material that will cause a hydrating reaction; and further comprising the step of causing a hydrating reaction with the material independently of the curing agent to bond the water as a hydrate.

8. The process for producing solidified radioactive wastes as defined in claim 7, wherein barium silicate is used as the curing agent and calcium silicate is used as the material liable to cause the hydrating reaction.

9. The process for producing solidified radioactive wastes as defined in claim 3, wherein the alkaline earth metal compound is a calcium silicate compound.

10. The process for producing solidified radioactive wastes as defined in claim 1, wherein the alkali silicate solution is a sodium silicate solution.

11. The process for producing solidified radioactive wastes as defined in claim 9 wherein the calcium silicate compound has a Ca/Si ratio ranging from 2 to 3.

12. The process for producing solidified radioactive wastes as defined in claim 9, wherein the calcium silicate compound has a Ca/Si ratio of about 3.

13. The process for producing solidified radioactive wastes as defined in claim 1, wherein cement is used as the curing agent.

14. The process for producing solidified radioactive wastes as defined in claim 13, wherein portland cement or blast furnace slag cement is used as the cement.

15. The process for producing solidified radioactive wastes as defined in claim 2, wherein said heating and curing are conducted in a pressure vessel containing the mixture and said step of maintaining flows saturated steam into the pressure vessel.

16. The process for producing solidified radioactive wastes as defined in claim 2, wherein said heating and curing are conducted in a pressure vessel and said maintaining charges an excess amount of water within the pressure vessel, and said heating vaporizes the excess water inside of the vessel as the step of maintaining by providing saturated steam.

17. The process for producing solidified radioactive wastes as defined in claim 2, including sealing the mixture inside a container within a heated furnace prior to said heating.

18. The process for producing solidified radioactive wastes as defined in claim 2, including sealing the mixture within a container prior to said heating.

19. The process for producing solidified radioactive wastes as defined in claim 1, wherein said mixing is conducted in a container and, thereafter, sealing the container prior to said heating.

20. The process for producing solidified radioactive wastes as defined in claim 1, wherein during said heating, reacting the alkaline earth metal compound in a hydrating reaction with the water content in the solution of alkali silicate to bond the water as a hydrate.

21. A substantially water-insoluble solid for preventing the release of radioactive waste material as produced by the method of claim 1.

22. The product of claim 21, wherein the solid has pores having diameters less than 0.05 $cm^3/g$.

23. A substantially water-insoluble solid for preventing the release of radioactive waste material as produced by the method of claim 2.

24. A substantially water-insoluble solid for preventing the release of radioactive waste material as produced by the method of claim 3.

25. A substantially water-insoluble solid for preventing the release of radioactive waste material as produced by the method of claim 4.

26. A substantially water-insoluble solid for preventing the release of radioactive waste material as produced by the method of claim 7.

27. A substantially water-insoluble solid for preventing the release of radioactive waste material as produced by the method of claim 20.

* * * * *